United States Patent [19]
Clarey et al.

[11] Patent Number: 6,014,297
[45] Date of Patent: *Jan. 11, 2000

[54] APPARATUS FOR DETECTING ARCING FAULTS AND GROUND FAULTS IN MULTIWIRE BRANCH ELECTRIC POWER CIRCUITS

[75] Inventors: Robert J. Clarey, Mt. Lebanon; Richard P. Sabol, Munhall; Robert Tracy Elms, Monroeville, all of Pa.

[73] Assignee: Eaton Corporation, Cleveland, Ohio

[*] Notice: This patent is subject to a terminal disclaimer.

[21] Appl. No.: 09/268,850

[22] Filed: Mar. 16, 1999

Related U.S. Application Data

[63] Continuation-in-part of application No. 08/939,263, Sep. 29, 1997, Pat. No. 5,889,643.

[51] Int. Cl.$^7$ ...................................................... H02H 3/00
[52] U.S. Cl. ............................ 361/42; 361/45; 361/93.1; 361/115
[58] Field of Search .................................. 361/42, 45, 93, 361/96, 115, 93.1

[56] References Cited

U.S. PATENT DOCUMENTS

| | | | |
|---|---|---|---|
| 5,224,006 | 6/1993 | MacKenzie et al. | 361/45 |
| 5,307,230 | 4/1994 | MacKenzie | 361/96 |
| 5,459,630 | 10/1995 | MacKenzie et al. | 361/45 |
| 5,519,561 | 5/1996 | Mrenna et al. | 361/105 |
| 5,546,266 | 8/1996 | MacKenzie et al. | 361/93 |
| 5,889,643 | 3/1999 | Elms | 361/42 |

*Primary Examiner*—Jeffrey Gaffin
*Assistant Examiner*—Stephen Jackson
*Attorney, Agent, or Firm*—Martin J. Moran

[57] ABSTRACT

A multiwire branch circuit including two line conductors and a grounded, common neutral conductor is protected by a two pole circuit breaker connected to independently interrupt overcurrent conditions in the two ungrounded line conductors. Three separate protection circuits provide arc fault protection for each of the ungrounded line conductors and ground fault protection for all three conductors. The arc fault detectors use the bimetal of the thermal-magnetic trip device for the associated line conductor for current detection, and therefore, are individually referenced to the associated line voltage. Hence, the outputs of the arc fault detectors are electrically isolated from each other and from the output of the ground fault detector, but operate a common trip circuit to simultaneously open both poles of the two pole circuit breaker. The arc fault detectors have separate isolated power supplies. The ground fault detector is powered by a supply which is energized if either of the ungrounded line conductors is energized.

10 Claims, 3 Drawing Sheets

APPARATUS FOR DETECTING ARCING FAULTS AND GROUND FAULTS IN MULTIWIRE BRANCH ELECTRIC POWER CIRCUITS

RELATED APPLICATION

This application is a continuation-in-part of U.S. patent application Ser. No. 08/939,263 filed on Sept. 29, 1997, now U.S. Pat. No. 5,889,643 issued Mar. 30, 1999.

BACKGROUND OF THE INVENTION

1. Field of the Invention

This invention relates to apparatus providing protection in multiwire branch circuits of electric power distribution systems, and in particular, to circuit breakers providing protection from arcing faults and ground faults in such circuits.

2. Background Information

Branch circuits in electric power distribution systems often share a common neutral conductor to reduce the wiring required. Such multiwire branch circuits are often referred to as "home runs." Home runs are only permitted under certain conditions. Generally, they are permitted as long as the two line conductors are energized by separate phases or by a center tapped single phase to avoid overloading the neutral conductor, and as long as all ungrounded conductors are disconnected simultaneously at the panel board where the branch circuits originate. This simultaneous disconnection of the ungrounded conductors can be accomplished with a two pole disconnect, two single pole circuit breakers with a handle tie, or a two pole circuit breaker.

Presently, such multiwire branch circuits are provided with short circuit and overcurrent protection by the tied single pole breakers or the two pole breaker. Only the two pole breaker can also provide ground fault protection by the addition of a common ground fault detector.

Recently, there has been an increased interest in providing protection from arc faults. Arc faults are intermittent high impedance faults which can be caused for instance by worn insulation, loose connections, broken conductors, and the like. Because of their intermittent and high impedance nature, they do not generate currents of sufficient instantaneous magnitude or sufficient average current to trigger the thermal-magnetic trip device which provides the short circuit and overcurrent protection. Various types of arc fault detectors have been proposed, but to my knowledge they have not been adapted to multiwire branches.

Parent application Ser. No. 08/939,263 filed on Sept. 23, 1998 discloses apparatus for detecting faults in multiwire branch circuits where both poles are tripped simultaneously in response to all faults, overcurrent, arcing and ground faults, regardless of which line conductor is involved. This arrangement complies with the general conditions for multiwire branch circuits discussed above where all ungrounded conductors must be opened simultaneously. This is because the two line conductors can be connected to a single appliance, such as an electric stove for instance, to provide 220 volts, or to two separate outlets in a common receptacle. However, where the two line conductors, with the common neutral, are connected to independent loads, both circuits do not have to be interrupted simultaneously in response to an overcurrent condition (a short circuit or overload) in one line conductor. By only interrupting current in the affected line conductor, disruption of service is minimized. On the other hand, an arcing fault occurs because of a wiring failure. This wiring failure may be in the multiwire cable, and therefore, both poles should be tripped.

There is a need for a circuit breaker which can provide arc fault protection as well as overcurrent, and ground fault protection for multiwire branch circuits and which isolates overcurrent trips to the affected circuit while tripping both circuits in response to arc faults or ground faults.

SUMMARY OF THE INVENTION

These needs and others are satisfied by the invention which is directed to an apparatus for detecting faults in multiwire branch circuits. It includes a two pole circuit breaker having a first pole connected to interrupt current in the first line conductor and a second pole connected to interrupt current in the second line conductor. The first and second poles have first and second thermal magnetic trip devices which operate independently to only interrupt an overcurrent condition in the affected pole. The apparatus further includes fault detection circuitry including a first arc fault detector connected to detect arc currents in the first line conductor and to generate a first trip signal in response thereto, a second arc fault detector connected to detect arc currents in the second line conductor and to generate a second trip signal in response thereto, and a ground fault detector connected to detect ground faults between each of the line conductors and ground and generate a third trip signal. The apparatus also includes means responsive to any of these three trip signals to trip both poles of the circuit breaker. Preferably, the ground fault detector detects neutral to ground faults in addition to line to ground faults. It is also preferred that the ground fault detector have a power supply fed by each of the line conductors so that it remains operative even with one line unpowered.

Preferably, the arc fault detectors utilize the bimetal of the respective pole which is connected in series with the associated line conductor as a known impedance for monitoring the line current. In such an arrangement, the first and second arc fault detectors are referenced to the associated line conductor, and the trip signals are electrically isolated such as by optocouplers from the common trip circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
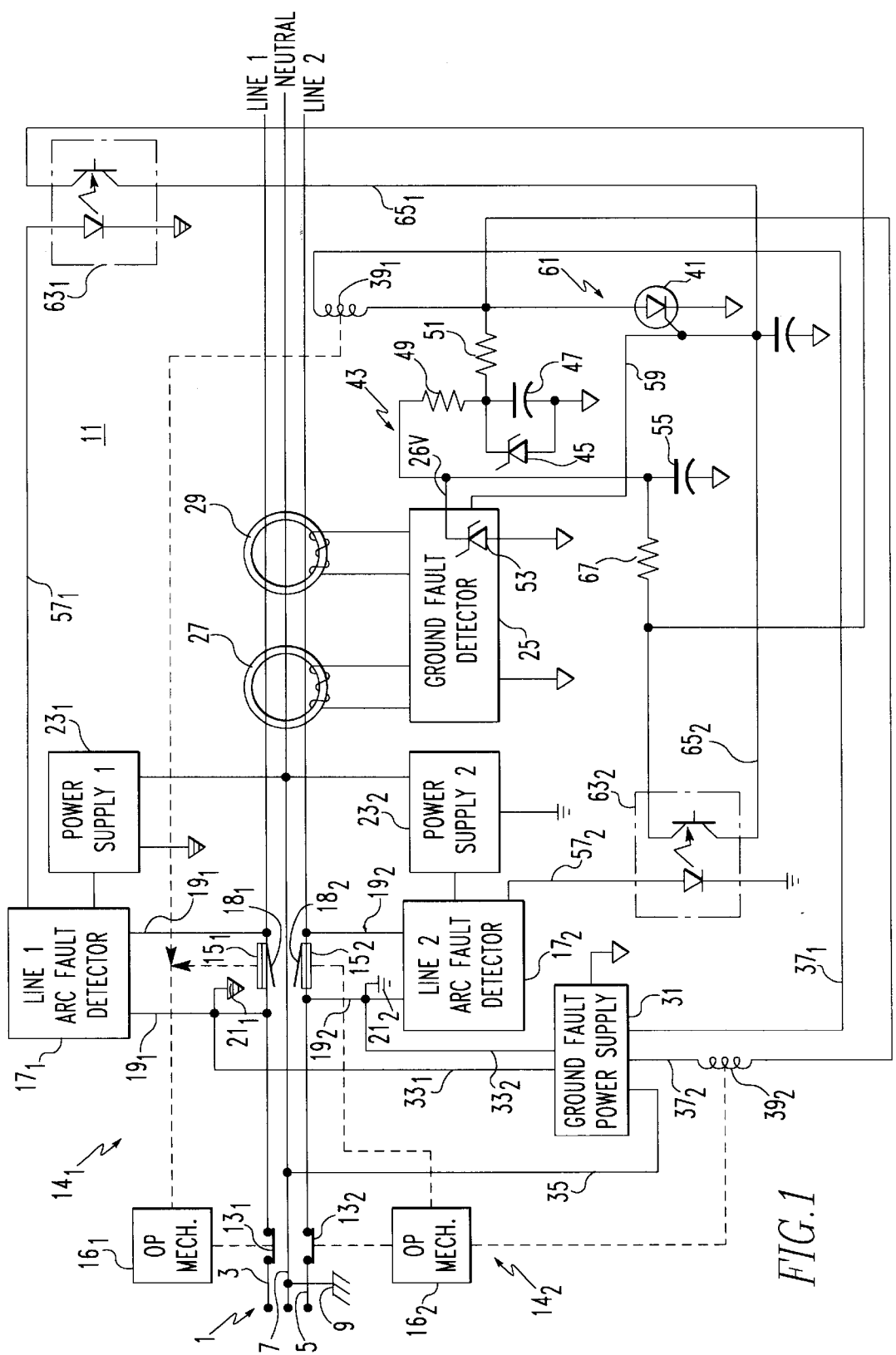
FIG. 1 is a schematic diagram partly in block form of apparatus in accordance with the invention.

Referring to FIG. 1, a multiwire branch circuit 1 of an electric power distribution system includes a first line conductor 3, a second line conductor 5 and a common neutral conductor 7. As previously mentioned, the two line conductors 3 and 5 are energized by separate phases, or a center tapped single phase supply voltage. Typically, the neutral conductor is grounded as shown at 9. Protection in this multiwire branch circuit 1 is provided by a two pole circuit breaker 11 which includes separable contacts $13_1$ and $13_2$ connected in series in the line conductors 3 and 5, respectively. Each pole has a thermal-magnetic trip device $14_1, 14_2$ which includes a bimetal $15_1$ and $15_2$ connected in series in the associated line conductor. The bimetals 15 respond to the heat generated by persistent overcurrent conditions to trip a spring powered operating mechanism $16_1$, $16_2$ which is mechanically connected to open the associated set of separable contacts $13_1$ or $13_2$. The thermal-magnetic trip devices also include a magnetic actuator $18_1$, $18_2$ which actuates the associated operating mechanism to instantaneously open the corresponding contacts $13_1$ or $13_2$ in response to very high overcurrents such as those associated with a short circuit. The thermal-magnetic trip devices $14_1$, $14_2$ operate independently, and hence, only interrupt overcurrents in the associated pole.

The two pole circuit breaker 11 is located in a load center (not shown) which provides for distribution of power in various circuits such as the multiwire branch circuit 1. In addition to the instantaneous and delayed overcurrent protection provided by the thermal-magnetic trip devices, the two pole circuit breaker also includes arc fault protection for each of the line conductors 3 and 5 and ground fault protection for all three conductors 3, 5 and 7. Separate arc fault detectors $17_1$ and $17_2$ are provided for the line conductors 3 and 5, respectively. Each of these arc detectors includes a current sensor to detect current in the associated line conductor. In the preferred embodiment of the invention, the bimetal 15 is used as the current sensor. As the low resistance of the bimetal 15 is known, the voltage drop across the bimetal is a measure of the current in the associated line conductor. The voltages across the bimetals are sensed through the leads $19_1$ and $19_2$. Since the arc fault detectors 17 use the associated bimetal 15 as a current sensor, they need to be referenced to the associated line voltage. Accordingly, the Line 1 arc fault detector $17_1$ has a ground $21_1$ referenced to the line conductor 3 while the Line 2 arc fault detector $17_2$ has a ground $21_2$ referenced to the line 2 conductor 5. Each of the arc fault detectors $17_1$ and $17_2$ has its own power supply $23_1$ and $23_2$ connected between the associated line conductor and the neutral conductor 7.

Ground fault protection is provided by the ground fault detector 25. In the preferred embodiment of the invention, the well known dormant oscillator type ground fault detectors employed. A first ground fault detector coil 27 encircles all three of the conductors 3, 5 and 7. In the absence of a ground fault, the resultant current through the coil 27, carried by the three conductors will be zero. A ground fault on either of the line conductors 3 or 5 will create an imbalance in the currents which will be detected by the coil 27. As the neutral conductor 7 is grounded at 9 close to the circuit breaker 11, a ground fault between neutral and ground will not generate a sufficient imbalance in current for the coil 27 to detect. A second coil 29 is used to inject a small voltage into the neutral conductor. If a ground fault is present on the neutral conductor, a loop completed by this ground fault will support an oscillation which will be detected by the ground fault circuitry.

The ground fault detector 25 is powered by a ground fault power supply 31. The ground fault power supply 31 is connected to both of the line conductors 3 and 5 by the leads $33_1$ and $33_2$ so that the ground fault detector 25 is operational if at least one of the line conductors 3 or 5 is energized and the contacts 13 of the circuit breaker are closed. A common lead 35 is connected between the ground fault power supply 31 and the neutral conductor 7. As will be seen, with both line conductors 3 and 5 energized the output voltage of the ground fault supply provided on the leads $37_1$ and can be as high as about 300 volts dc. This voltage is used to energize shunt trip coils $39_1$ and $39_2$ which results in the opening of both sets of separable contacts $13_1$ and $13_2$ when a silicon controlled rectifier (SCR) 41 is turned on in a manner to be discussed. A circuit 43 draws power from the ground fault power supply 31 through the coils $39_1$ and $39_2$ to energize the ground fault detector circuit 25. The current drawn by this power circuit 43 is insufficient to energize the coils to open the contacts 13, but is sufficient to operate the ground fault detector 25. The circuit 43 includes a zener diode 45 which clamps the voltage across a capacitor 47 to about 43 volts. A resistor 49 forms a filter with the capacitor 47 for this 43 volts dc. Another resistor 51 limits the current drawn by the circuit 43 to below the level needed to energize the coil 37 and open the separable contacts 13. The 43 volts dc is applied to the chip implementing the ground fault detector 25 which contains an arrangement of zener diodes represented by the zener diode 53 which generate 26 volts and other voltages needed by the ground fault detector circuit 25. This 26 volt dc is filtered by a capacitor 55.

The Line 1 arc fault detector $17_1$ generates a trip signal on a lead $57_1$ in response to detection of an arc fault on the line 1 conductor 3. Similarly, the Line 2 arc fault detectors $17_2$ generates a trip signal on the lead $57_2$ in response to detection of an arc fault on the line 2 conductor 5. The ground fault detector 25 generates a trip signal on the lead 59 in response to detection of a ground fault between any one of the conductors 3, 5 and 7 and ground. The ground faults detected by the detector 25 can be direct faults to ground Dr themselves can be arcing faults between a conductor and ground.

A common trip circuit 61 responds to a trip signal generated by any one of the arc fault detectors $17_1$ or $17_2$ or the ground fault detector 25. This common trip circuit 61 includes the SCR 41, which when turned on energizes the trip coils $39_1$ and $39_2$ to open the separable contacts 13. As the arc fault detectors $17_1$ and $17_2$ are referenced to the line conductor on which they are providing protection, the three detector circuits must be electrically isolated from one another. This isolation is provided by optocouplers $63_1$ and $63_2$ which convert the trip signals on the leads $57_1$ and $57_2$ to signals on leads $65_1$ and $65_2$ of the common trip circuit 61. Drive current for the optoisolators $63_1$ and $63_2$ is provided from the 26 volt dc supply of the ground fault detector circuit 25 through resistor 67. The leads $65_1$ and $65_2$ from the optoisolators are connected in parallel which each other and with the lead 59 from the ground fault detector 25 to the gate of the SCR 41 so that any one of the three signals can trip the contacts $13_1$ and $13_2$ of both poles open.

As will be noted, the thermal-magnetic trip devices only open the contacts in the associated pole, while the arc fault circuits and the ground fault circuit open both poles. This arrangement is used where the loads connected to the two poles are independent. Under such circumstances, overcurrents and especially overloads result from conditions it the load, and hence, disruption is minimized by only interrupting current to the affected load. On the other hand, arcing and ground faults are typically wiring problems which could be occurring in the home run cable. Therefore, in response to these indications of a wiring problem, both circuits are interrupted.

Figure 2:
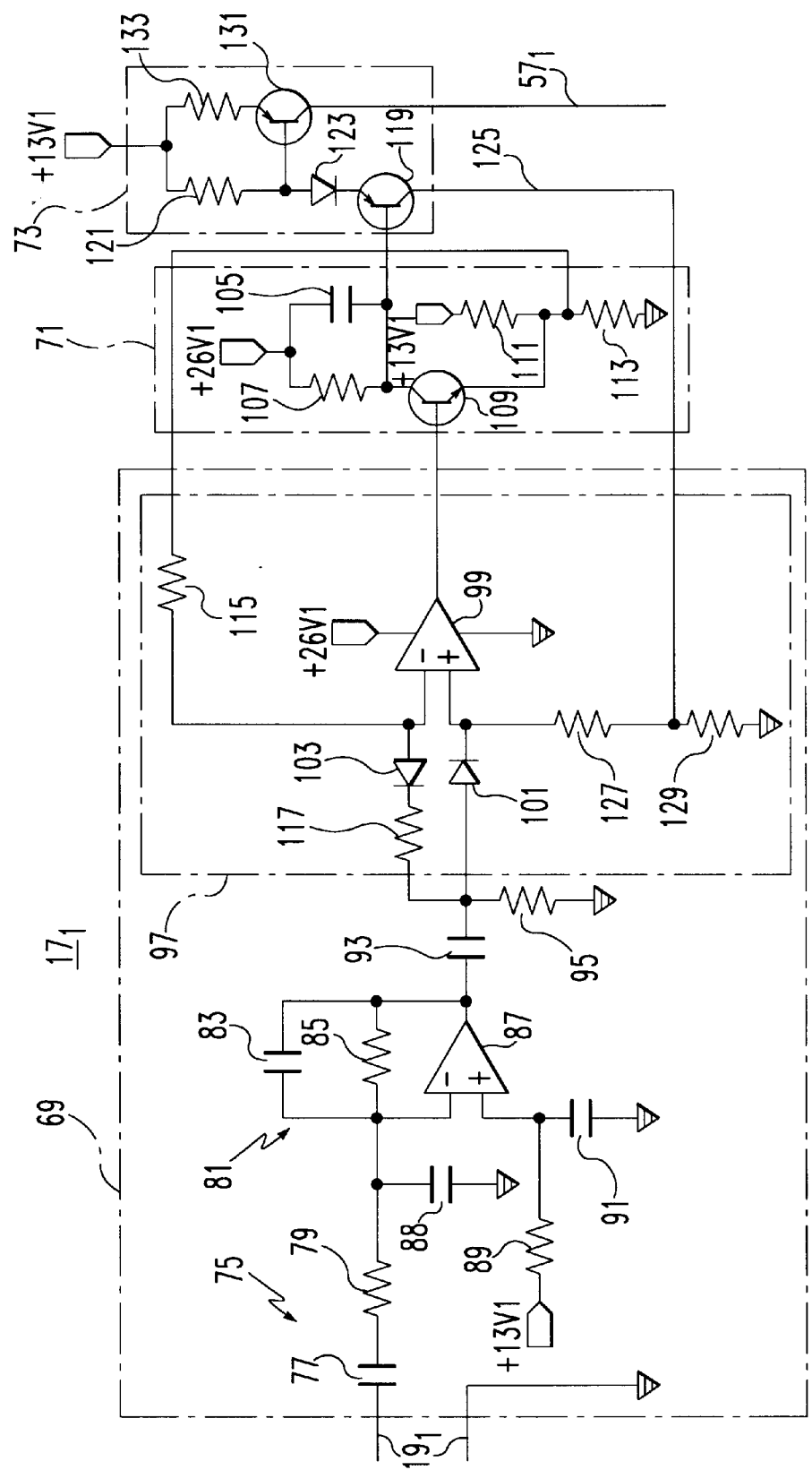
FIG. 2 is a schematic diagram of the arc fault detectors which form part of the apparatus of FIG. 1.

FIG. 2 illustrates a suitable arc fault circuit $17_1$. A similar circuit can be provided for the arc fault circuit $17_2$ keeping in mind that each must be referenced to the line conductor for which it is providing protection since the bimetal in the conductor is being used for current detection. The voltage across the associated bimetal 15 is provided on the leads 19₁. The arc fault circuit 17 includes a pulse generator 69, a circuit 71 which provides a time attenuated accumulation of the pulses generated by the pulse generator 69, and an output circuit 73 which provides a trip signal on the lead 57.

The pulse generator 69 includes a high pass filter 75 formed by the series connected capacitor 77 and resistor 79, followed by a low pass filter 81 formed by the parallel connected capacitor 83 and resistor 85. The high pass filter 75 and low pass filter 81 have a band pass in a range of about 400 to 590 Hz which generates pulses in response to the step increases in current caused by striking of an arc.

An operational amplifier (op amp) 87 provides gain for the pulses. A capacitor 88 reduces high frequency noise in the pulse signals. The op amp 87 is biased at its non-inverting input by a 13 vdc supply voltage. A resistor 89 and capacitor 91 delay application of the bias to prevent false trip signals during power up. The positive and negative pulses generated by the band pass filter ride on the plus 13vdc volt bias applied to the op amp 87. This bias is removed by the ac coupling capacitor 93 which along with the resistor 95 forms another high pass filter stage. The bi-polar pulse signal resulting is rectified by a rectifier circuit 97 which includes another op amp 99. Positive pulses are applied to the non-inverting input of the op amp 99 through the diode 101 while negative pulses are applied to the inverting input through the diode 103. The output of the op amp 99 is a pulse signal having pulses of a single polarity.

The circuit 71 generates a time attenuated accumulation of the pulses in the pulse signal generated by the pulse generator 69. The pulses are accumulated on a capacitor 105 connected to the 26 vdc supply. A bleed resistor 107 connected across the capacitor 105 provides the time attenuation. The pulses are applied to the capacitor 105 through a transistor 109. When no pulses are generated, both electrodes of the capacitor 105 are at 26 volts. The pulses from the pulse generator 69 provide base drive current for the transistor 109. A voltage divider formed by the resistor 111 and 113 connected at their common connection to the emitter of the transistor 109 set the minimum amplitude for the pulses to turn on the transistor 109. This threshold is selected so that pulses which could be generated by some normal loads, such as for instance a dimmer switch operating at normal loads, are not accumulated. The amplitude of the pulses is set by the gain of the op amp 99 which in turn is determined by the ratio of the feed back resistor 115 and input resistor 117. The amplitude and duration of each pulse determine the amount of charge which is applied to the capacitor 105. The successive pulses are accumulated through the summation of the charge they add to the capacitor 105. The resistor 107 continuously bleeds the charge on the capacitor 105 with a time constant determined by the values of the capacitor 105 and resistor 107 to time attenuate the accumulation of the pulses. It can be appreciated that the magnitude and time interval between pulses determines the instantaneous voltage that appears across the capacitor 105.

The output circuit 73 monitors the voltage across the capacitor 105 representing the time attenuated accumulation of the pulses in the pulse signal generated by the pulse generator. Each pulse lowers the voltage on the capacitor which is applied to the base of a transistor 119 in the output circuit. A voltage is applied to the emitter of the transistor 119 by the 13 vdc supply through a resistor 121 and diode 123. With no pulses being generated, the voltage on the base of the transistor 119 is 26 volts. Without the diode 123, the 13 volt reverse bias would destroy the base to emitter junction of the transistor 119. The diode 123 withstands this voltage. When the voltage at the lower end of the capacitor 105, and therefore on the base of the transistor 119, falls below the 13 volts minus the forward drop across the diode 123, the transistor 119 is turned on. Feedback provided through the lead 125 and the resistors 127 and 129 holds the transistor 119 on by providing a continuous output of the op amp 99 which holds the transistor 109 on. Turn on of the transistor 119 provides base drive current for the transistor 131 which draws current limited by the resistor 133 to generate an arc fault trip signal on the lead 57₁. The trip signal actuates the optocoupler 63₁ which turns on the SCR 41 to trip the separable contacts 13 open. The larger the pulses in the pulse signal generated by the pulse generator 69 the harder the transistor 109 is turned on, and hence, the faster charge is accumulated on the capacitor 105.

Figure 3:
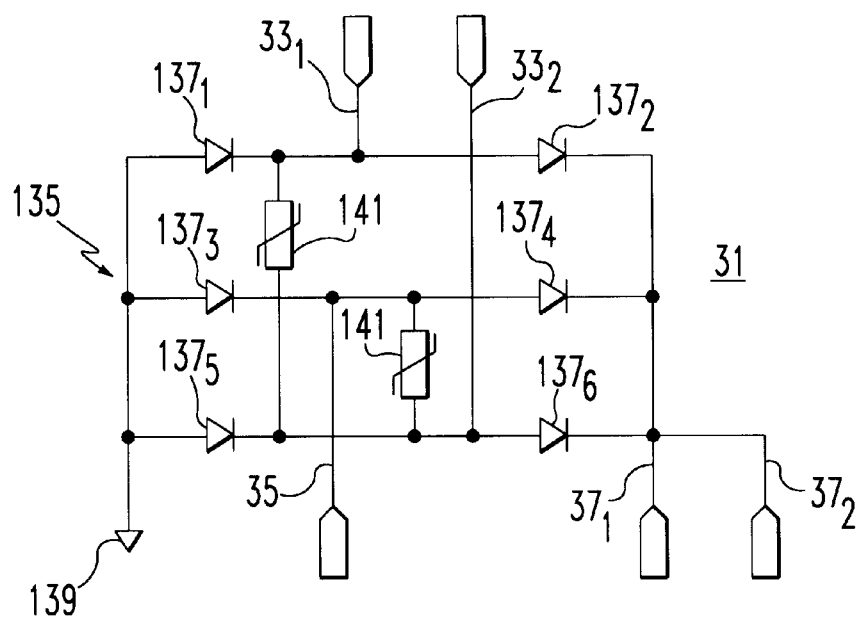
FIG. 3 is a schematic diagram of the ground fault power supply.

A circuit diagram of the ground fault power supply 31 is shown in FIG. 3. This power supply includes a bridge circuit 135 having six diodes 137. Power is supplied to the bridge from the Line 1 conductor 3 through the lead 33₁ and from the Line 2 conductor 5 through the lead 33₂. Output of the bridge is between the leads 37₁ and 37₂ and the ground fault common 139. The lead 33₁ is connected to the mid-point of one leg of the bridge 135 while the lead 33₂ is connected to the mid-point of another leg. The neutral conductor 7 is connected to the mid-point of the third leg through the lead 35. A pair of metal oxide varistors (MOVs) 141 protect the power supply 31 from voltage surges on the line conductors. With both line conductors energized the output of the power supply 31 across the lead 37 and common 139 is the line to line voltage. With only one line conductor energized, the output of the power supply 31 is the line to neutral voltage. As can be seen, the potential of the ground fault common 139 changes. When the diode 137₁ is conducting, ground fault common 139 is tied to the voltage on Line 1. With the diode 137₃ conducting, it is tied to the voltage on Line 2, and if one line is not energized so that diode 137₅ conducts on positive half cycles of the line voltage, the ground fault common 139 is tied to neutral.

Figure 4:
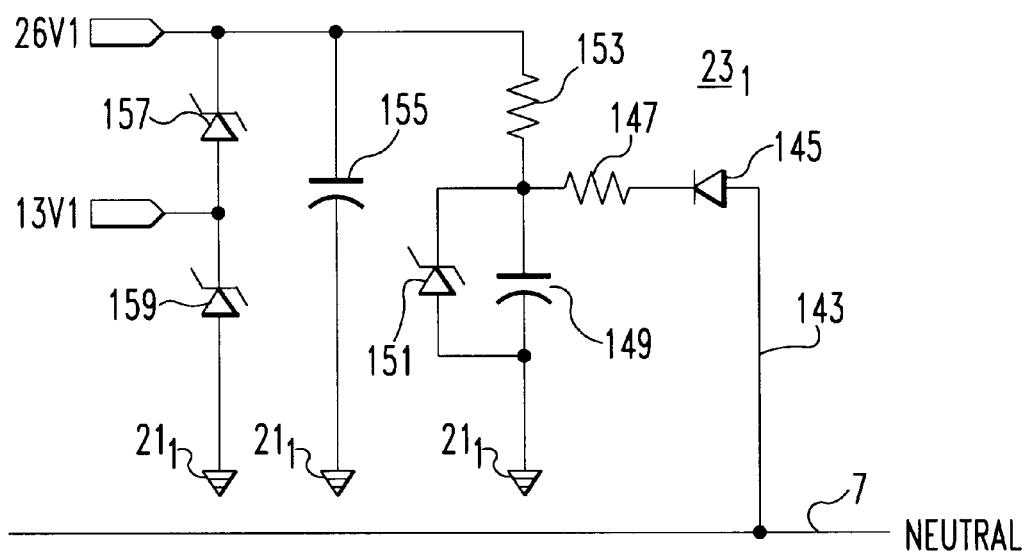
FIG. 4 is a schematic diagram of the power supplies for the arc fault detectors.

FIG. 4 illustrates the power supply 231 for the Line 1 arc fault detector 17₁. This power supply is connected on the hot side to the neutral conductor 7 through the lead 143. The other side of the power supply is connected to the Line 1 conductor 3 through the Line 1 arc fault detector common 21₁. The diode 145 halfwave rectifies the neutral to Line 1 voltage and the resistor 147 converts this rectified voltage signal to about a 6 milliamp current which charges a capacitor 149. The voltage across capacitor 149 is clamped to 43 volts dc by the zener diode 151. Resistor 153 and capacitor 155 form a second filter. The voltage across the capacitor 155 is clamped at 26 volts dc by the zener diodes 157 and 159 to provide the 26 vdc₁ for the Line 1 arc fault detector 17₁. The common junction between zener diodes 157 and 159 provides the 13 vdc₁ supply voltage for arc fault detector 17₁. The power supply 23₂ for the Line 2 arc fault detector 17₂ has a similar circuit configuration except that it is referenced to the common 21₂.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. Apparatus for detecting faults in multi-wire branch circuits including a first line conductor and a second line conductor fed by separate phases or a single center tapped phase, and a common neutral conductor, said apparatus comprising:

a two-pole circuit breaker having a first pole with a thermal-magnetic trip device connected to interrupt current in said first line conductor in response to an overcurrent, condition in said first line conductor, and a second pole with a second thermal-magnetic trip device connected to interrupt current in said second line conductor in response to an overcurrent condition in said second line conductor, said first and second magnetic trip devices operating separately to only interrupt current in the first and second line conductors, respectively; and fault detection circuitry including a first arc fault detector connected to detect arc currents in said first line conductor and generate a first trip signal in response thereto, a second arc fault detector connected to detect arc currents in said second line conductor and generate a second trip signal in response thereto, a ground fault detector connected to detect ground faults in each of said first line conductor and said second line conductor and generate a third trip signal in response thereto, and response means responsive to any of said first trip signal, said second trip signal and said third trip signal to trip both said first pole and said second pole of said two-pole circuit breaker open simultaneously, said response means comprising a common trip circuit and means electrically isolating said first trip signal, said second trip signal and said third trip signal from each other.

2. The apparatus of claim 1 wherein said ground fault detector further includes means detecting neutral to ground faults.

3. The apparatus of claim 2 wherein said ground fault detector includes a ground fault power supply supplied by each of said first line conductor and second line conductor.

4. The apparatus of claim 3 wherein said first pole includes a first known impedance in series in said first line conductor, said first arc fault detector includes means monitoring a first voltage across said first known impedance as an indication of current in said first line conductor, and means referencing said first voltage to said first conductor, and wherein said second pole includes a second known impedance connected in series with said second line conductor, said second arc fault detector includes means monitoring a second voltage across said second known impedance as an indication of current in said second line conductor, and means referencing said second voltage to said second line conductor.

5. The apparatus of claim 4 wherein said first arc fault detector further includes a first power supply referenced to said first line conductor, and wherein said second arc fault detector includes a second power supply reference to said second line conductor.

6. The apparatus of claim 4 wherein said first known impedance is a first bimetal in said first thermal-magnetic trip device, and wherein said second known impedance is a second bimetal in said second thermal-magnetic trip device.

7. Apparatus for detecting faults in multi-wire branch circuits including a first line conductor and a second line conductor fed by separate phases or a single center tapped phase, and a common neutral conductor, said apparatus comprising:

a two-pole circuit breaker having a first pole with the first thermal-magnetic trip device connected to interrupt current in said first line conductor in response to an overcurrent condition in said first line conductor, a first known impedance in series with said first line conductor, and a second pole with a second thermal-magnetic trip device connected to interrupt current in said second line conductor in response to an overcurrent condition in said second line conductor and a second known impedance connected in series with said second line conductor, said first and second magnetic trip devices operating separately to only interrupt current in the first and second line conductors, respectively; and fault detection circuitry including:
a first arc fault detector connected to detect arc currents in said first line conductor and generate a first trip signal in response thereto and including means monitoring a first voltage across said first known impedance as a measure of current in said first line conductor and means referencing said first voltage to said first conductor;

a second arc fault detector connected to detect arc currents in said second line conductor and generate a second trip signal in response thereto and including means monitoring a second voltage across said second known impedance as an indication of current in said second line conductor, and means referencing said second voltage to said second line conductor;

a ground fault detector connected to detect line to ground faults in each of said first line conductor and second line conductor and generating a third trip signal in response thereto; and means responsive to any of said first trip signal, said second trip signal and said third trip signal to trip said first pole and said second pole of said circuit breaker open simultaneously.

8. The apparatus of claim 7 wherein said first known impedance is a first bimetal in said first thermal-magnetic trip device and, and wherein said second known impedance is a second bimetal in said second thermal-magnetic trip device.

9. The apparatus of claim 8 wherein said first arc fault detector further includes a first power supply referenced to said first line conductor, and wherein said second arc fault detector includes a second power supply referenced to said second line conductor.

10. The apparatus of claim 7 wherein said ground fault detector also includes means detecting a neutral to ground fault and generating a said third signal in response thereto, and wherein said ground fault detector is powered by a ground fault power supply supplied by each of said first line conductor and second line conductor.

* * * * *